United States Patent
French et al.

(10) Patent No.: US 8,400,957 B2
(45) Date of Patent: *Mar. 19, 2013

(54) PROPAGATION OF CHANGES IN A NETWORK

(75) Inventors: Paul Basil French, Cork (IE); Mark Jonathan Lucas, Cork (IE); Niall Jude Lucey, Cork (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,994

(22) Filed: Mar. 12, 2012

(65) Prior Publication Data

US 2012/0178430 A1    Jul. 12, 2012

Related U.S. Application Data

(63) Continuation of application No. 12/764,167, filed on Apr. 21, 2010.

(30) Foreign Application Priority Data

Oct. 28, 2009    (EP) .................................... 09174314

(51) Int. Cl.
*H04B 7/14* (2006.01)
(52) U.S. Cl. ................... 370/315; 370/329; 370/401
(58) Field of Classification Search .................. None
See application file for complete search history.

(56) References Cited

U.S. PATENT DOCUMENTS

| | | | |
|---|---|---|---|
| 7,594,262 B2 * | 9/2009 | Hanzlik et al. | 726/15 |
| 7,701,900 B2 * | 4/2010 | Barnum | 370/329 |
| 2005/0114164 A1 * | 5/2005 | Lyons | 705/1 |
| 2007/0298821 A1 | 12/2007 | Bush | 455/507 |
| 2008/0188260 A1 * | 8/2008 | Xiao et al. | 455/522 |
| 2011/0096714 A1 * | 4/2011 | French et al. | 370/315 |

FOREIGN PATENT DOCUMENTS

WO    WO 2007/015089    2/2007

OTHER PUBLICATIONS

Gupta et al., "SWAN: A Swarm-Intelligence Based Framework for Network Management of IP Networks," Proc. Int. Conf. Computational Intelligence and Multimedia Applications 2007, Dec. 2007, pp. 114-118.

* cited by examiner

*Primary Examiner* — Robert Wilson
(74) *Attorney, Agent, or Firm* — VanLeeuwen & VanLeeuwen; John D. Flynn

(57) ABSTRACT

A network of nodes and connections is provided, each connection connecting two nodes. A method of operating a first node in the network includes detecting a change in a node connected to the first node, identifying that the number of nodes connected to the first node with the detected change is above a predetermined threshold, and executing the detected change at the first node and/or propagating the detected change to one or more nodes connected to the first node that do not have the detected change.

11 Claims, 6 Drawing Sheets

PROPAGATION OF CHANGES IN A NETWORK

RELATED APPLICATIONS

This application is a continuation of U.S. application Ser. No. 12/764,167, filed Apr. 21, 2010, titled "Propagation of Changes in a Network," which is based on and claims the benefit of priority from European Patent Application EP 09174314.6, filed Oct. 28, 2009.

BACKGROUND

Many technical systems can be modelled as a collection of nodes and connections between the nodes. For example computers in an Intranet can be modelled as such a network, as can cells in a mobile phone system. In a mobile wireless network, system changes are often required to be propagated to a large number of network elements, nodes or devices. For example, a certain parameter or set of parameters of a number of cells (for example all cells under a specific base station controller) may need to be updated to the same value. Examples of these types of parameters include handover parameters, power control, and so on. Another example could be that a software patch needs to be downloaded to all nodes in a certain area. In mobile phone standards such as 2G, 2.5G, 3G based networks, parameters of tens or hundreds of cells need to be modified in this way. In a femtocell network (a femtocell is a small cellular base station, typically designed for use in a home or small business) this number could increase to tens of thousands or millions of nodes that need to be updated.

The propagation of changes in such a network is traditionally carried out from a central point which will communicate the changes to each and every node in the network. Centralized, transaction-oriented solutions which control configuration changes globally are available. These solutions have a number of practical difficulties owing to the scale involved. They are usually complex and time-consuming. Most of the intelligence in these systems is at the central point that is initiating the changes. In certain types of networks, the nodes are not necessarily available to receive the change when the central point wishes to make the changes. For example, in a femtocell network, the local wireless point may be switched off.

SUMMARY

According to an embodiment of the present invention, there is provided a method of operating a first node in a network of nodes and connections, each connection connecting two nodes, wherein the method comprises the steps of detecting a change in a node connected to the first node, identifying that the number of nodes connected to the first node with the detected change is above a predetermined threshold, and executing the detected change at the first node and/or propagating the detected change to one or more nodes connected to the first node that do not have the detected change.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
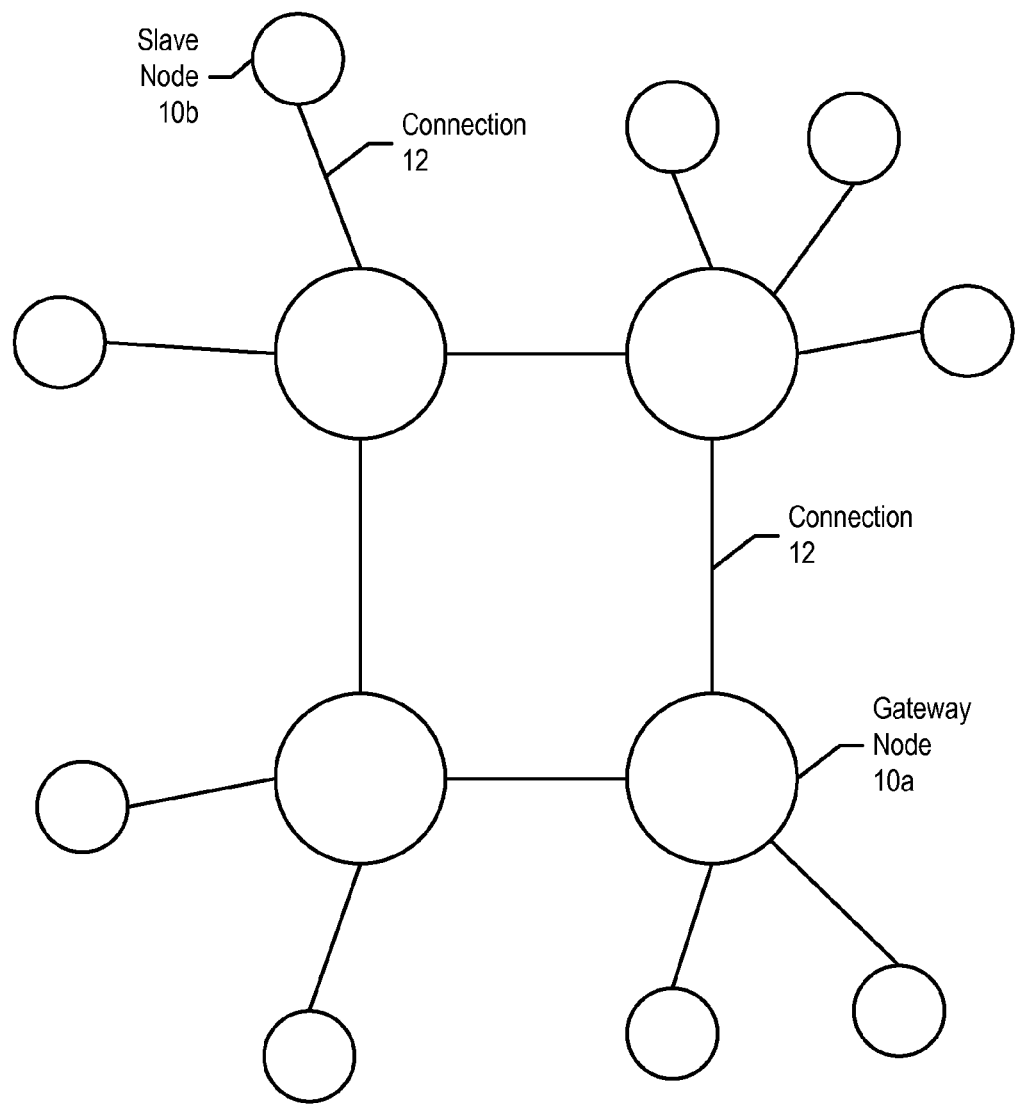
FIG. 1 is a schematic diagram of a network of nodes and connections.

It is possible to provide a more effective propagation of changes in a network of nodes, which is particularly appropriate for delivering parameter propagation in a femtocell environment. An embodiment of the invention is a decentralised configuration change propagation mechanism for use in, for example, a femtocell environment. This system uses simple rules at each node and one or more swarming algorithm(s) to effect more widespread configuration changes. The increase in scale of networks that includes femtocells constitutes a problem to be solved and the new mechanisms are proposed to achieve the parameter change propagation. An embodiment of the invention provides a new mechanism in which individual femtocell changes can be coordinated, in order to achieve overall network improvement. An embodiment of the invention applies to any large scale distributed system in which group configuration changes need to be made. Examples of such systems are multiple home network management and 3G, 4G wireless networks, wireless handsets.

A decision to make a change can be instigated by a node itself (as well as through other means), the knowledge that this change has been made can be made available to other nodes in the system through the use of a gateway node, and other nodes can then decide to make the change themselves, because they observe that sufficient of their peers have made the change. The configuration changes nodes make are designed to make sure that the nodes are not allowed to act selfishly to the detriment of other nodes.

In one embodiment, the network includes a gateway node. This is a location that maintains a database of information in relation to the configuration of the leaf nodes in the system, that those nodes themselves are permitted to query to help inform their own decision making. Note that the gateway node does not need to be a single central node, though in small topologies it could be. In general, there can be many gateway nodes distributed through a large environment. So it does not represent a single point of information, and does not create a problem in scaling the system. Gateway nodes, like other nodes in the system, can also pass configurations changes to other gateway nodes. The gateway node can also be scaled right down, so that every node maintains a database of the configuration changes made by nodes in their vicinity, received directly from a neighbor or indirectly from an intermediate node, and use this information to make their own decisions, as well as being prepared to pass it on to the neighbors. The gateway node can be considered as a "meeting point" in the network topology. A home node B gateway (HNB-GW) is an example of a meeting point in 3GPP.

In one embodiment, the invention can be used for configuration and/or update parameter propagation in a femtocell and wireless networking environment. In mobile wireless networks, system changes are often required to be propagated to a large number of network elements or devices. The invention provides, in this embodiment, a decentralised configuration change propagation mechanism in a femtocell and wireless cell environment. The system utilizes simple rules at each node and a set of algorithms to effect more widespread configuration changes. Individual cell changes are coordinated in order to achieve overall network improvement. Each femtocell invokes simple rules for each configuration parameter and performs self-configuration changes as appropriate. This change could also be manually instigated or seeded from an EMS (Element Management System). An example of a rule could be "maintain handover success rate between femtocell and macro cell to be >90%, otherwise change handover algorithm in this cyclical order value1, value2, value3". A different rule could be "if more than 15% of neighbors change to a new value for handover algorithm, change to that value".

There may be an order of magnitude increase in the number of femtocells compared to 2.5G or 3G networks. For example, there could be up to 7 million femtocells in a medium sized network compared to 300K cells in a medium-large 2.5G network. Controlling configuration change propagation from a central position or on a point-to-point basis would be hugely laborious and error-prone. Additionally, in the femtocell environment, the operator does not control (direct ownership or contract) either the communication path to the femtocell or the power-source for the femtocell. This means that coordinated network-wide changes would possibly never complete because there would always be a large number of femtocells that did not get the message, and yet need to catch up with multiple such changes when they are capable of doing so at a later point. With such a large volume of cells it would be very burdensome for a central point to continually keep track of which femtocells have yet to be updated with which network-wide change. It is much more efficient and effective to offload this job to the femtocell itself based on there being tracking of other connected nodes.

The increase in the number of femtocells has created a problem with the existing centrally-controlled mechanism to achieve configuration change, which is slow and error-prone. An embodiment of the present invention is a method of seeding of the configuration changes (for example instigated from an EMS or instigated from self-organizing rules of each node, etc) which uses new decision making algorithms (for example applying the 15% rule mentioned above or using a consensus) with novel configuration change propagation algorithms themselves, that for example piggy-back on other existing messages to nodes, nodes passing on information to their neighbors, or nodes picking up these decisions as the pass the meeting point. Thus, a single node is not burdened with all the work. This work is distributed.

In one embodiment of the invention, the method further comprises storing a node group membership list defining a group of nodes comprising one or more nodes, and wherein the step of propagating the detected change to one or more nodes connected to the first node that do not have the detected change comprises propagating the detected change to the nodes defined in the node group membership list. It may be convenient to split the network up into groups of nodes (a node may be a member of more than one group) in order to be able to have a practical method of determining that the threshold has been reached and in determining to which nodes to propagate the changes.

In one embodiment of the invention, the method further comprises designating the first node as a gateway node and wherein the step of propagating the detected change to one or more nodes connected to the first node that do not have the detected change comprises propagating the detected change to other gateway nodes. Within a large network of nodes and connections, it may be convenient to designate some nodes as gateway nodes, and these nodes can be responsible for detecting the changes in connected nodes and then propagating those changes to the nodes connected to the gateway node. In addition, the propagation of changes would be speeded up by a gateway node also communicating the changes to other gateway nodes, even if not directly connected to those gateway nodes. These other gateway nodes can then propagate the changes to the nodes connected to them.

In one embodiment of the invention, the method further comprises storing one or more rules, ascertaining whether the detected change conflicts with a rule and only executing or propagating the detected change is it does not conflict with a rule. A node has a definition of survivability, which ensures the survival of the node in an operational sense. This definition can be codified in one or more rules that the node cannot break. This will mean that even if changes have been made by sufficient connected nodes that they should be implemented and/or propagated, the node will not do this if they conflict with the rules for survivability. This prevents the propagation of corrupting or malicious changes that would have a detrimental effect on one or more nodes.

In one embodiment of the invention, the step of detecting a change in a node connected to the first node comprises receiving a notification from the node detailing the change. The detection by the first node (which could be a gateway node) of a connected node that has implemented a change can take the form of receiving a communication from that node. Nodes in the network can be configured so that they will inform a specific node whenever they implement a change. The notified node then has responsibility for identifying when sufficient nodes have made the specific change and making the change itself and/or propagating the change to other nodes.

An example of network of nodes 10a and 10b and connections 12 is shown in FIG. 1. Each connection 12 connects two nodes 10 together. The network is a logical representation of a physical network. A set of computers and servers, for example, could be modelled by the network shown in FIG. 1. The nodes 10 could represent cells in a mobile telephony system, with the physical hardware of a wireless base station being present in each node 10. The connections 12 represent real physical connections between the entities that are represented by the nodes 10. This could be wired communication channels such as telephone lines or as according to common standards such as Ethernet or similar wireless standard.

The nodes 10 have been represented in FIG. 1 in two different sizes. The larger nodes 10a can be thought of as gateway nodes 10a, while the smaller nodes 10b are simply slaves to the gateway nodes. In general, a slave node 10b will only connect to a single gateway node 10a and the gateway nodes 10a will connect to a group of slave nodes 10b and also to one or more additional gateway nodes 10a. It can be seen that communications travelling in a network configured this way will always pass through one or more gateway nodes 10a. This subdivision of nodes into gateways 10a and slaves 10b will not necessarily be appropriate for all networks.

The network modeled in FIG. 1 could be a 3G network with femtocells. A femtocell is a small localised network, for example for use within a small business, which will handle a small number of mobile handsets. A local wireless router will run the femtocell and connect to the wider 3G network via a wired broadband connection. In the network illustrated, the nodes 10b could be individual femtocells that are each connected to a home node B gateway (HNB-GW), which manages the connections of multiple femtocells 10b to the network, shown as a gateway node 10a. All of the femtocells 10b that are connected to an HNB-GW 10a form a group of femtocells.

Figure 2:
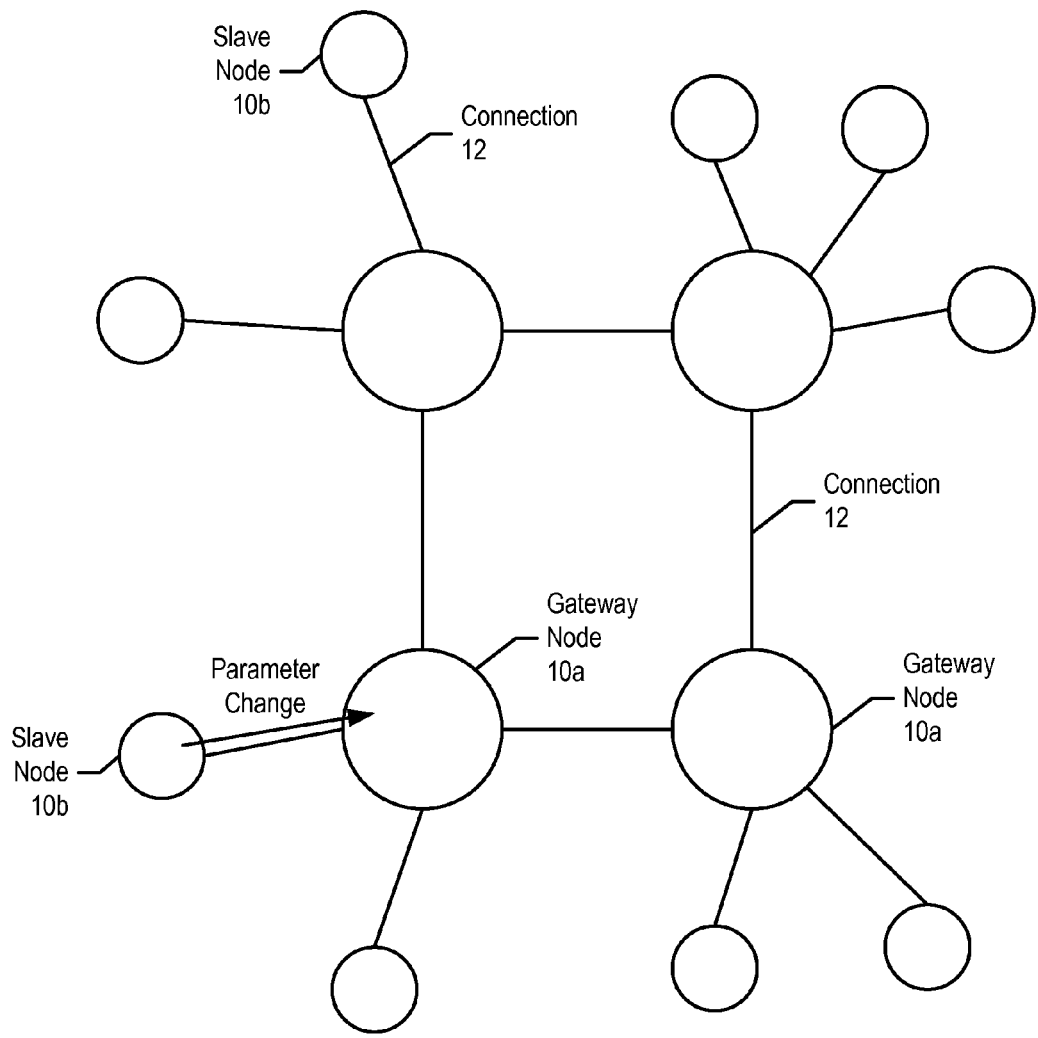
FIG. 2 is a further schematic diagram of the network.

The network of nodes and connections is operated to provide a decentralised algorithm for configuration change propagation in the femtocell environment. Each femtocell 10b stores values for specific configuration parameters and is provisioned with a configuration modification rule set for each configuration parameter that is part of this decentralised mechanism. When a rule is triggered, the femtocell 10b takes action by modifying the relevant value. This value change is forwarded to the controlling HNB-GW 10a, as shown in FIG. 2. As an alternative, an operator at a central location may manually instigate the change by modifying the parameter in a number of femtocells 10b. When a node 10 makes a change, this is notified to a gateway node 10a.

The HNB-GW 10a stores this information including to which group the femtocell 10b belongs (the simplest grouping is all femtocells 10b under the control of the specific HNB-GW 10a, but it could be other groups). More than one group may exist. However, a femtocell 10b may be a member of one group only. As normal traffic continues to pass through the gateway 10a from other femtocells 10b, the gateway 10a makes checks to see if the same configuration changes have been made by other members of the group of femtocells 10b. An algorithm executes on the HNB-GW 10a, which may be triggered if the number of members of the group who have made the specific change exceeds a certain percentage, so that all members in the femtocell group will make the same configuration change.

Once this point has been reached, each femtocell 10b, which had not made the configuration changes up to this point, will now make the same changes. There a number of ways that this propagation can occur, discussed in more detail below. The benefits and advantages of this solution to the propagation of changes is that a centralized approach to configuration change, which is costly and complex, is not required. This network requires simple self-configuration rules at each node 10 and one or more swarming algorithms to effect the configuration changes more widely. A node will detect when other connected nodes have made a change and will either then make that change itself and/or propagate that change to other connected nodes.

Femtocell bulk configuration is therefore propagated by the individual femtocells 10b and gateways 10a. Each femtocell 10b invokes simple rules for each configuration parameter and performs self-configuration changes as appropriate. This change could also be manually instigated or seeded from a central point in the network that is connected to multiple gateways. Femtocell operations and maintenance traffic is aggregated at the gateways 10a and these changes are stored in a repository of the respective gateway 10a. One or more algorithms are executed by the gateways and when these changes need to be applied to all members of a femtocell group, mechanisms are invoked to apply the changes to all members.

Figure 3:
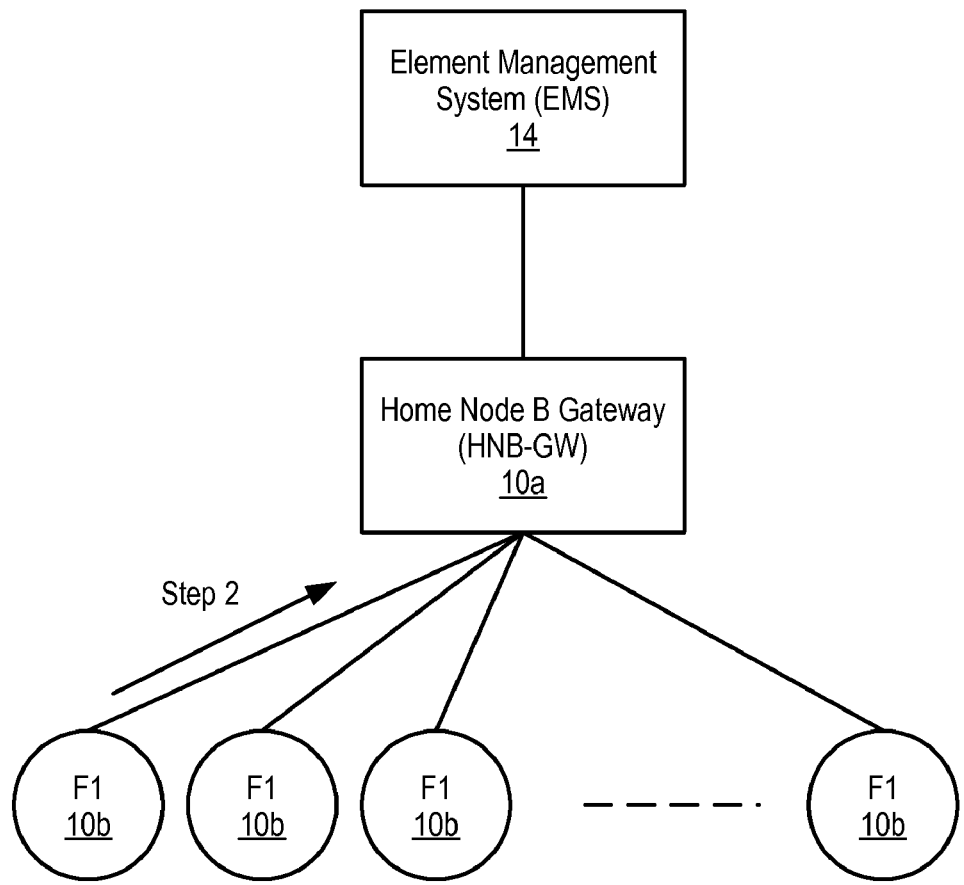
FIGS. 3 and 4 are schematic diagrams of a femtocell embodiment of a network.
Figure 4:
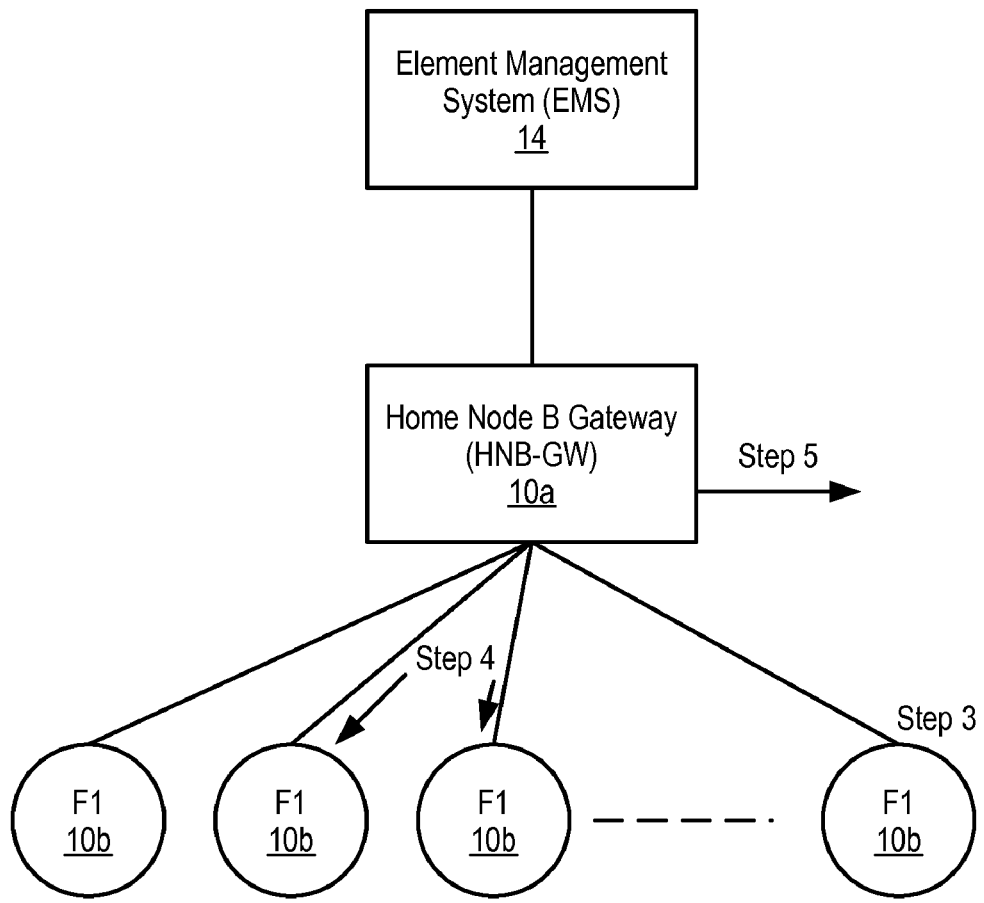

A use case to show how the system works is shown in FIGS. 3 and 4. Each femtocell 10b is configured with simple rules, for example, rule 1=maintain handover success rate between femtocell and macro cell to be >90%, otherwise change handover algorithm in this cyclical order value1, value2, value3. A second rule could be Rule 2=if more than 15% of neighbors change to a new value for handover algorithm, change to that value too. The second rule embodies the principle of the propagation of any changes detected in any nodes connected to the femtocell. The actual awareness of the change in a neighbor could come from either connected node, or from a third party node in the network.

Step 1 as shown in FIG. 3 is the step of an operator at the EMS seeding the configuration change by applying the handover algorithm configuration change to a number of femtocells 10b. An alternative step 1 could occur when, for example, a self-configuration rule of femtocell F1 triggers a value change and therefore, for example, femtocell F1 changes its handover algorithm parameter to value2 (rule 1 above). At step 2 the femtocell F1 communicates this change to the HNB-GW 10a, whether the change was seeded from the EMS or was made by the femtocell 10b itself without being seeded from the EMS. The HNB-GW 10a maintains a list of femtocells 10b under its control and the configuration changes each has made. Note that the femtocells 10a under a HNB-GW 10b is only one configuration of a femtocell, there may be others.

Step 3 is shown in FIG. 4. All femtocells 10b under the control of the HNB-GW 10a operate the simple rules listed above. Some individual cells 10b will change, some will not change, some will change to different values, but all femtocells 10b will follow all simple rules including the rule for maintaining sufficient handover success rate (rule 1 above). Note that the actual rules may be different for each parameter. A key difference between a femtocell 10b and a regular cell in a wireless network is that the wireless operator has no control (no contract relating to) the power to the femtocell 10b and the connectivity to the femtocell 10b. This means that, for a femtocell 10b, it will be an entirely normal situation that a proposed configuration change cannot be applied to some of the femtocells 10b because those femtocells 10b are presently unavailable.

In this example, femtocell F2, which had been previously turned off, now restarts and invokes a registration mechanism with the gateway 10a, which results in the femtocell F2 joining the group of nodes connected to the gateway 10a. As traffic from each femtocell 10b passes through the gateway 10a, the gateway 10a and/or the femtocell F2 checks to see configuration changes made by other femtocells 10a and the percentage of neighbors which have made any detected changes. If more than 15% (for example) of neighbors to the femtocell F2 have made that change, then femtocell F2 will also make the necessary change. Note that other calculation techniques could also be applied.

At step 4, if the 15% rule has been fired, then the HNB-GW 10a directs each femtocell 10b in the group to update. An alternative to this propagation mechanism is that as traffic from other femtocells 10b passes through the HNB-GW 10a, they will see the invocation of the 15% rule and make the configuration change. The gateway 10a will keep this rule active until all femtocells 10b in the group associated with the gateway 10a have made the change. A timeout mechanism is also applied such that if all femtocells 10b have not applied the changes (e.g. femtocell is turned off) within the timeout period, the algorithm is deemed complete and is terminated.

A step 5 is also shown, which is an optional step. The HNB-GW 10a, when it has invoked a swarming algorithm execution on its group, then forwards that information (for example, parameter, new value, group_id) to any and all connected HNB-GW neighbors. In the same way as the propagation of the changes in a group are organised, if enough HNB-GW neighbors invoked the same algorithm change, a receiving HNB-GW 10a can use this as a swarming algorithm.

Figure 5:
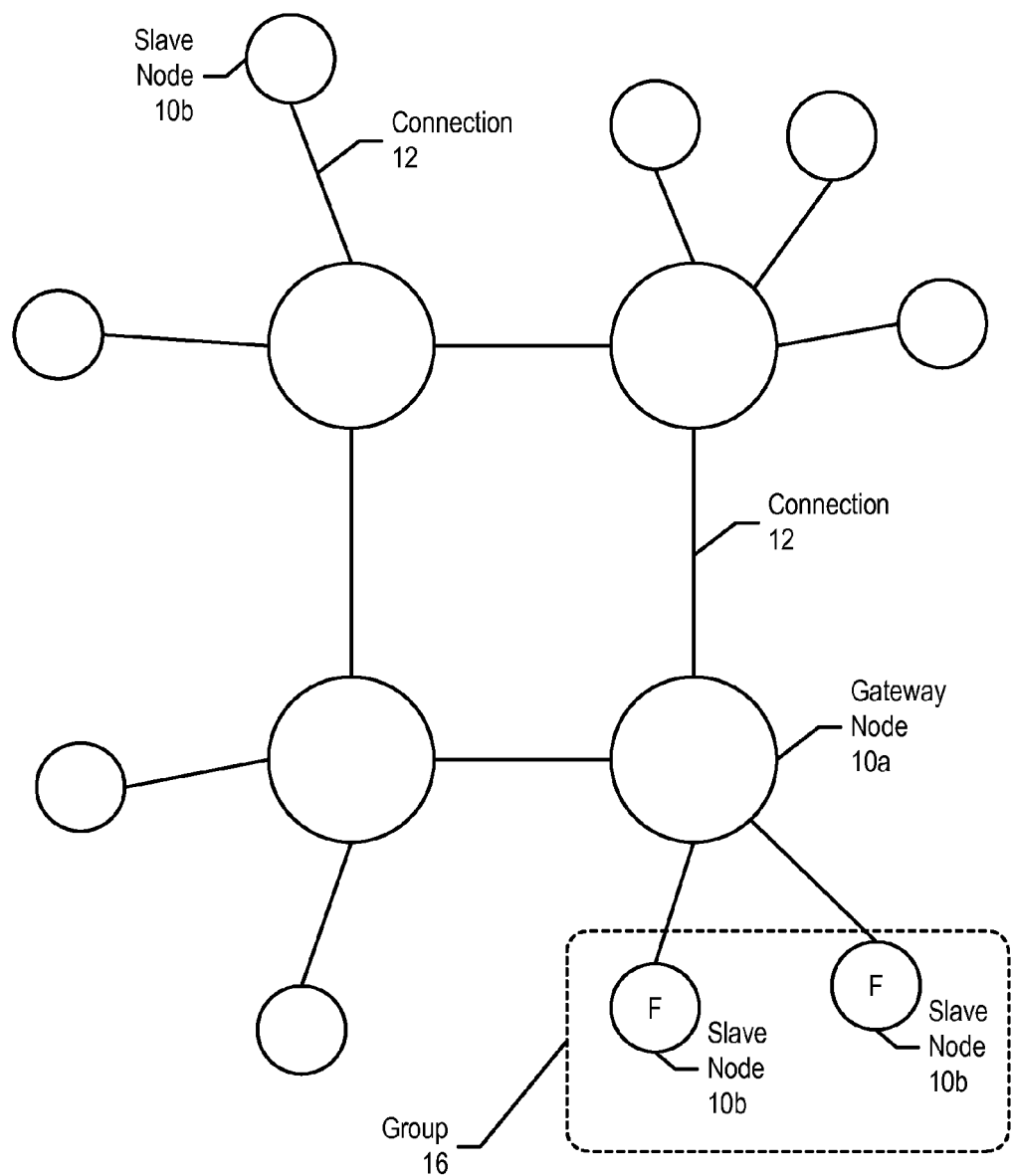
FIG. 5 is a further schematic diagram of the network showing a group.

In this network configuration, there is provided a femtocell group repository. Each femtocell 10b is part of a group. By default, this is all femtocells under a HNB-GW 10a. A femtocell 10b may be a member of only one group at a time. FIG. 5 illustrates the concept of a femtocell group 16. Here the nodes 10b labelled F form a group 16 of nodes connected to the gateway node 10a.

As mentioned above, there are provided operational rules per femtocell 10b. Each femtocell 10b is configured with a set of simple, self-organising rules. There may be separate rules for each configuration parameter. For example, handover control algorithm rules may be separate from ciphering and encryption algorithm rules. Common rules that apply to all parameters may also exist, for example relating to software load version management. Rules can also exist for items other than configuration parameters. An example of this could be software load version. A sample rule set and data for a handover control algorithm parameter could be:

| | |
|---|---|
| Configuration parameter: | Handover Control Algorithm |
| Rule: | If Availability <75%, change |
| Current Value: | 5 |
| Values to use: (in cyclical order) | 6, 7, 8 |

An example rules for software load version item could be:

| | |
|---|---|
| Configuration Item: | Software Load Version |
| Rule: | If Availability <75%, change |
| Current Value: | Version 1.5 |
| Values to use: (in cyclical order) | Version 1.4, Version 1.3 |

The configuration change repository exists at the meeting point for the group, which in this case will be the HNB-GW 10a. This repository keeps track of the group members (there may be more than one group 16) who have made changes. A sample of the type of this data may be Group ID, Parameter ID, Parameter Name, Femtocell ID, Current Value, Last Value, Date/Time, and Value List. Swarming algorithms exist at the HNB-GW 10a which govern group-wide decision making. As each femtocell 10b makes its own self-organising configuration changes based on its rule set, the femtocell 10b sends this information to the HNB-GW 10a, even if the change has been instigated from elsewhere. As more femtocells 10b make these changes, swarming algorithms are invoked which affect all members of the group 16. An example of such a rule is if 15% of femtocells 10b in a group change the value of their handover algorithm to, say Value2, then all femtocells 10b in that group 16 will change to that value.

There is provided a method for invocation of a swarming decision on all members of the group 16. When a swarming algorithm decision is made, a mechanism for the dissemination of this decision is invoked. In one embodiment of the invention, the HNB-GW 10a will send a message to each femtocell 10b in the group. Other methods are discussed below. As each femtocell 10b makes the change, this information is collated at the HNB-GW 10a until all members 10b update. The swarming algorithm execution is then terminated. While a swarming algorithm is being executed in a group 16, self-configuration rule evaluation is suspended in order to avoid endless looping. A timeout mechanism is applied such that if all femtocells 10b have not applied the changes (for example because a femtocell 10b is turned off) within the timeout period, the algorithm is deemed complete and is terminated.

A mechanism for a femtocell 10b to join a group 16 also exists. A femtocell 10b can register with the HNB-GW 10a to join the group 16 and subscribes to any information relating to the group, such as configuration changes. This mechanism is used, for example, when a femtocell 10b is turned on having been turned off by a home user, or in the case when a new femtocell 10b is added.

The gateway 10a is the meeting place for femtocell configuration traffic in the examples above. Other mechanisms for femtocells to communicate also exist, for example, neighbor-to-neighbor communication. The invocation of the swarming decision as described above involves the HNB-GW 10a using a push mechanism by sending a message to each femtocell 10b. Another way to achieve this is a pull mechanism whereby each femtocell 10b periodically checks with the HNB-GW 10a for any swarming decisions that affect the femtocell and thereafter downloads the changes. A third mechanism would be for the gateway 10a to piggy-back (add) swarming decisions to normal operations and maintenance traffic as such traffic goes to each femtocell 10b.

Figure 6:
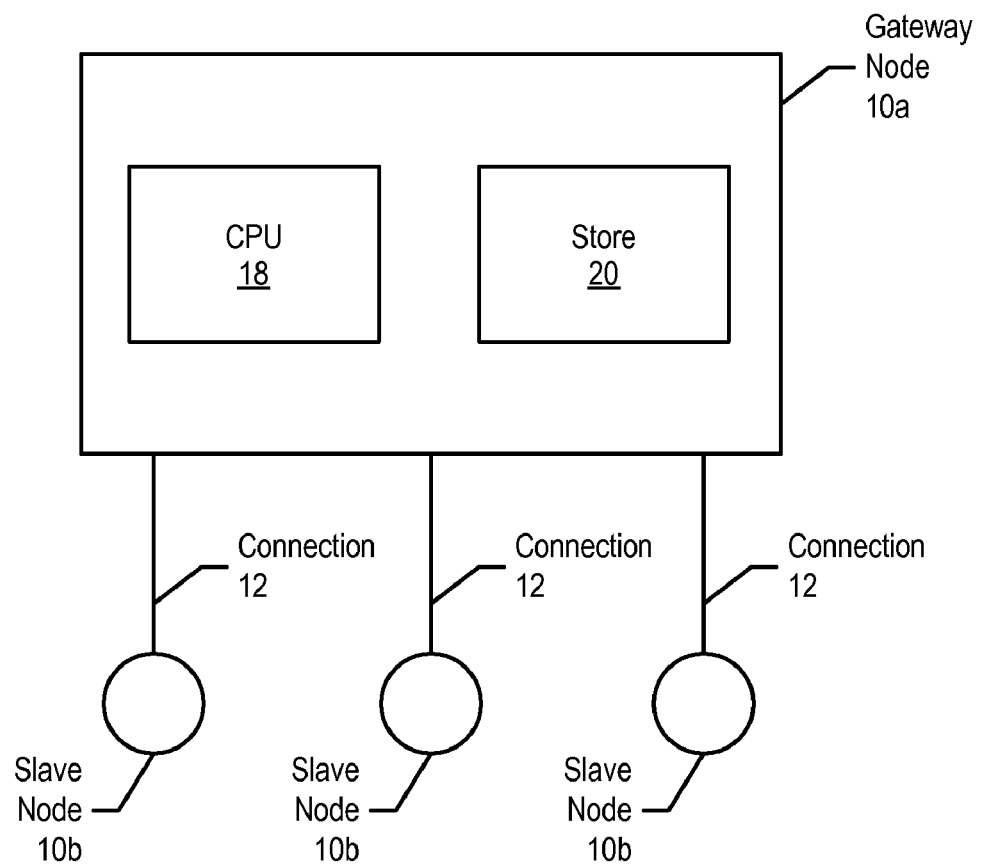
FIG. 6 is a schematic diagram of a gateway node.

FIG. 6 shows in more detail a gateway node 10a. The gateway node 10a is a first node in a network of nodes 10 and connections 12, each connection 12 connecting two nodes 10. The node 10a comprises a processing device 18 and a storage device 20. The processor 18 is arranged to detect a change in a node 10b connected to the first node 10a, identify that the number of nodes 10b connected to the first node 10a with the detected change is above a predetermined threshold, and to execute the detected change at the first node 10a and/or to propagate the detected change to one or more nodes 10b that are connected to the first node 10a that do not have the detected change. The detection of a change in a node 10b connected to the first node 10a may come from a notification from the node 10b detailing the change.

In an embodiment of the invention, the storage device 20 is arranged to store a node group membership list which defines a group 16 of nodes 10b comprising one or more nodes 10b, and the processing device 18 is arranged, when propagating the detected change to one or more nodes 10b connected to the first node 10a that do not have the detected change, to propagate the detected change to the nodes 10b defined in the node group membership list. In an embodiment of the invention, the storage device 20 is also further arranged to store one or more rules and the processing device 18 is further arranged to ascertain whether the detected change conflicts with a rule and only executing or propagating the detected change is it does not conflict with a rule.

The above describes how swarming algorithms are invoked as each femtocell 10b passes its configuration changes to the HNB-GW 10a. Another way to invoke swarming algorithms would be for the EMS to manually invoke them. This algorithm could be applied to other things besides configuration changes. It could, for example, be applied to software upgrade. A manual femtocell configuration parameter change instigated by an operator in the EMS, would, in turn, lead to more widespread changes in the group as described above. An operator could manually invoke execution of the swarming algorithm itself from the EMS. This is an alternative to the operator seeding the invocation by changing parameters in a number of femtocells 10b.

In one embodiment of the invention, a femtocell 10b belongs to one group at a time. An alternative is that a femtocell 10b could belong to multiple groups at the same time, if (a) the same self-configuration rules for each parameter remain the same, (b) different parameters were involved for each group. In one embodiment of the invention, when a femtocell 10b detects an issue with a parameter, the femtocell 10b selects the next value to go to using a simple cyclical order mechanism. The femtocell 10b chooses the next value in the list and loops around through the values if the rule should be triggered again. Other mechanisms to choose the next value to go with could be employed such as choose a value based on the experience of a neighbor, i.e. choose a value that a neighbor has chosen recently and which has worked well The invocation of swarming decision on all members of a group 16, described above, describes one embodiment of how self-configuration rules in all femtocells 20b in a group 16 are suspended while the swarming algorithm is being invoked. A special case for this suspension is that only the rules relating to the actual configuration parameter(s) being changed are suspended. This is an optional feature that can be deployed.

The algorithm described above is not tied specifically to a femtocell environment. The principle of the propagation of changes applies to any large scale distributed system in which group configuration changes need to be made. Another example of such a system is multiple home network management.

The invention claimed is:

1. A method of operating a first node in a network of nodes and connections, each connection connecting two nodes, wherein the method comprises the steps of:
   detecting, in response to a configuration change, a different configuration in a node connected to the first node;
   identifying a number of nodes, from a plurality of nodes connected to the first node, that include the different configuration;
   determining that the identified number of nodes exceeds a predetermined threshold; and
   instructing each of the plurality of nodes to implement the different configuration in response to the determination.

2. The method according to claim 1, further comprising the step of:
   propagating the different configuration to one or more nodes connected to the first node that do not have the detected change.

3. The method according to claim 2, and further comprising storing a node group membership list defining a group of nodes comprising one or more nodes, and wherein the step of propagating the different configuration to one or more nodes connected to the first node that do not have different configuration comprises propagating the different configuration to the nodes defined in the node group membership list.

4. The method according to claim 2, and further comprising designating the first node as a gateway node and wherein the step of propagating the different configuration to one or more nodes connected to the first node that do not have the different configuration comprises propagating the different configuration to one or more other gateway nodes.

5. The method according to claim 2, and further comprising storing one or more rules, ascertaining whether the different configuration conflicts with the one or more rules, and only propagating the different configuration if the different configuration does not conflict with the one or more rules.

6. The method according to claim 1, and further comprising storing one or more rules, ascertaining whether the different configuration conflicts with the one or more rules, and only executing different configuration if the different configuration does not conflict with the one or more rules.

7. The method according to claim 1, wherein the step of detecting the configuration change in the node connected to the first node comprise instructions for receiving a notification from the node detailing the different configuration.

8. The method of operating a first node in a network of nodes and connections, each connection connecting two nodes, wherein the method comprises the steps of:
   detecting a change in a node connected to the first node;
   identifying that a number of nodes connected to the first node with the different configuration is above a predetermined threshold; and
   propagating the different configuration to one or more nodes connected to the first node that do not have the detected change.

9. The method according to claim 8, and further comprising storing a node group membership list defining a group of nodes comprising one or more nodes, and wherein the step of propagating the different configuration to one or more nodes connected to the first node that do not have the different configuration comprises propagating the different configuration to the nodes defined in the node group membership list.

10. The method according to claim 8, and further comprising designating the first node as a gateway node and wherein the step of propagating the different configuration to one or more nodes connected to the first node that do not have the different configuration comprises propagating the different configuration to one or more other gateway nodes.

11. The method according to claim 8, and further comprising storing one or more rules, ascertaining whether the different configuration conflicts with the one or more rules, and only propagating the different configuration if it does not conflict with the one or more rules.

* * * * *